No. 655,966. Patented Aug. 14, 1900.
R. P. FELTON.
WEIGHING AND RECORDING SCALE.
(Application filed Feb. 3, 1900.)

(No Model.) 4 Sheets—Sheet 1.

WITNESSES.

INVENTOR
RALPH P. FELTON
BY Paul Hawley
HIS ATTORNEYS.

No. 655,966. Patented Aug. 14, 1900.
R. P. FELTON.
WEIGHING AND RECORDING SCALE.
(Application filed Feb. 3, 1900.)
(No Model.) 4 Sheets—Sheet 2.

WITNESSES.
E. G. Slaude
Richard Paul.

INVENTOR
RALPH P. FELTON
BY Paul Hawley
HIS ATTORNEYS.

No. 655,966.  
R. P. FELTON.  
WEIGHING AND RECORDING SCALE.  
(Application filed Feb. 3, 1900.)  
Patented Aug. 14, 1900.
(No Model.) 4 Sheets—Sheet 3.
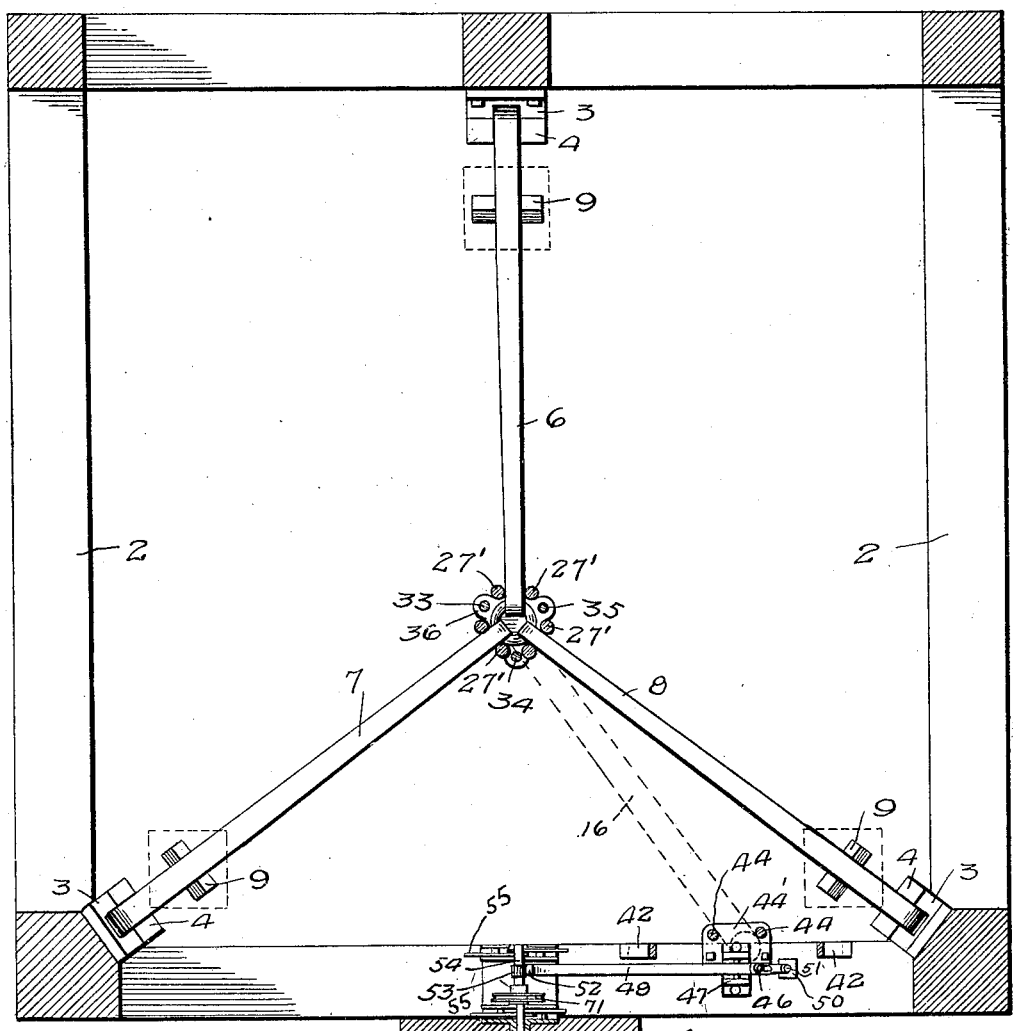
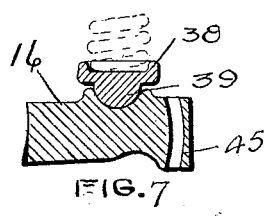
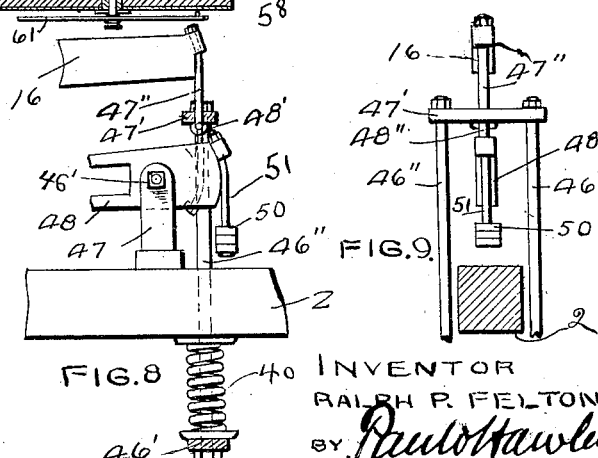
WITNESSES  
INVENTOR  
RALPH P. FELTON  
BY  
HIS ATTORNEYS.

No. 655,966. Patented Aug. 14, 1900.
R. P. FELTON.
WEIGHING AND RECORDING SCALE.
(Application filed Feb. 3, 1900.)
(No Model.) 4 Sheets—Sheet 4.
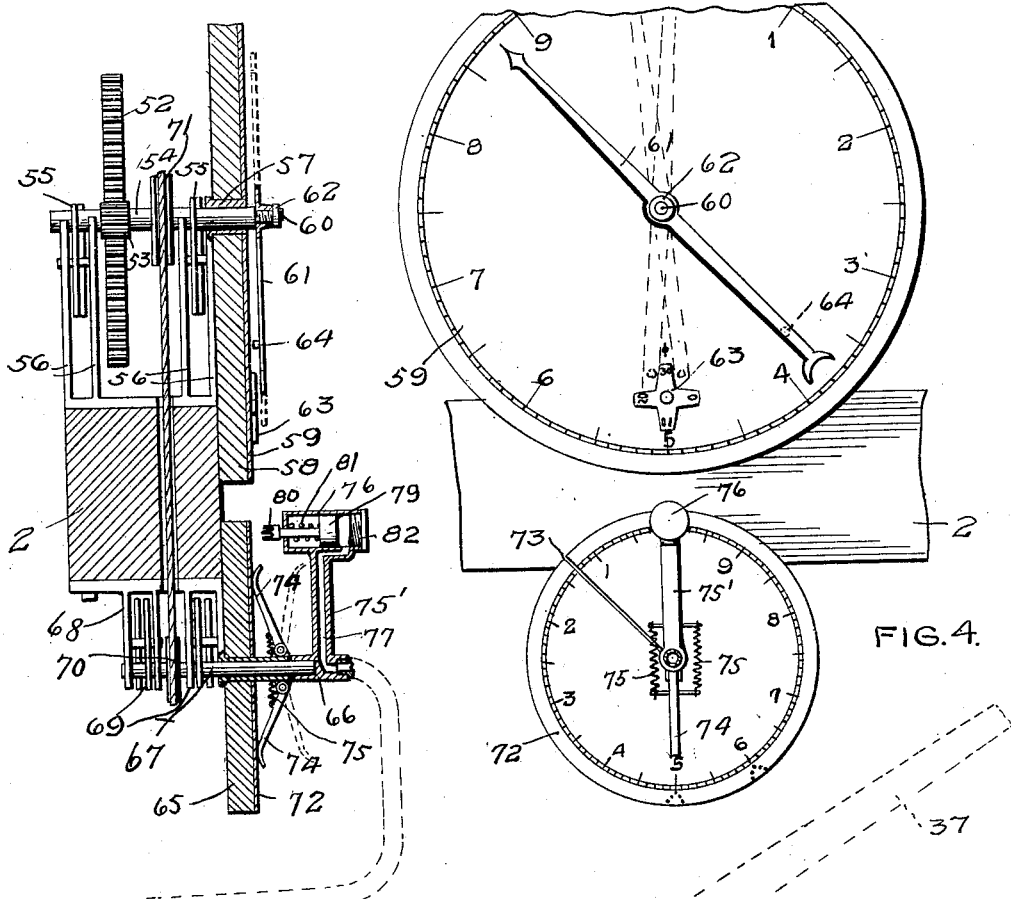
FIG. 4.
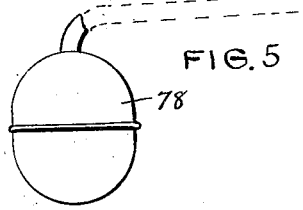
FIG. 5
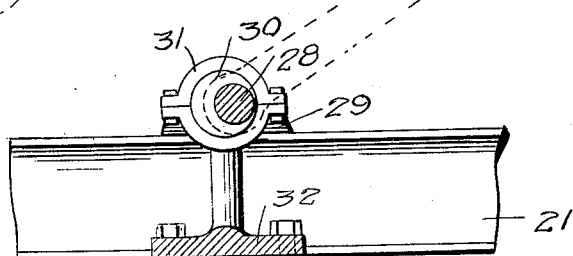
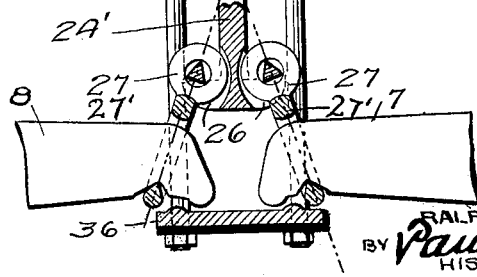
FIG. 6
Witnesses
E. G. Staude
Richard Paul
Inventor
Ralph P. Felton
By Paul O. Hawley
His Attorneys.
THE NORRIS PETERS CO., PHOTO-LITHO., WASHINGTON, D. C.

UNITED STATES PATENT OFFICE.

RALPH P. FELTON, OF MINNEAPOLIS, MINNESOTA.

WEIGHING AND RECORDING SCALE.

SPECIFICATION forming part of Letters Patent No. 655,966, dated August 14, 1900.

Application filed February 3, 1900. Serial No. 3,763. (No model.)

*To all whom it may concern:*

Be it known that I, RALPH P. FELTON, of the city of Minneapolis, county of Hennepin, State of Minnesota, have invented certain new and useful Improvements in Weighing and Recording Scales, of which the following is a specification.

The invention relates to weighing and registering scales designed particularly for use in connection with railway coaling-stations.

The objects of the invention are, first, to provide a scale having a hopper of large capacity from which any desired quantity of the coal or other material therein may be withdrawn whenever desired and means in connection therewith for ascertaining the weight of the material withdrawn; second, to provide means for indicating the total weight of the material in the hopper when full and the weight of the material left in the hopper after each successive withdrawal; third, to provide means for making a permanent record of the total weight of each withdrawal, and, fourth, to provide improved means for transmitting the motion of the scale-levers to the indicating mechanism, whereby unnecessary friction is avoided and more accurate results attained.

The invention consists generally in various constructions and combinations, all as hereinafter described, and particularly pointed out in the claims.

Figure 1:
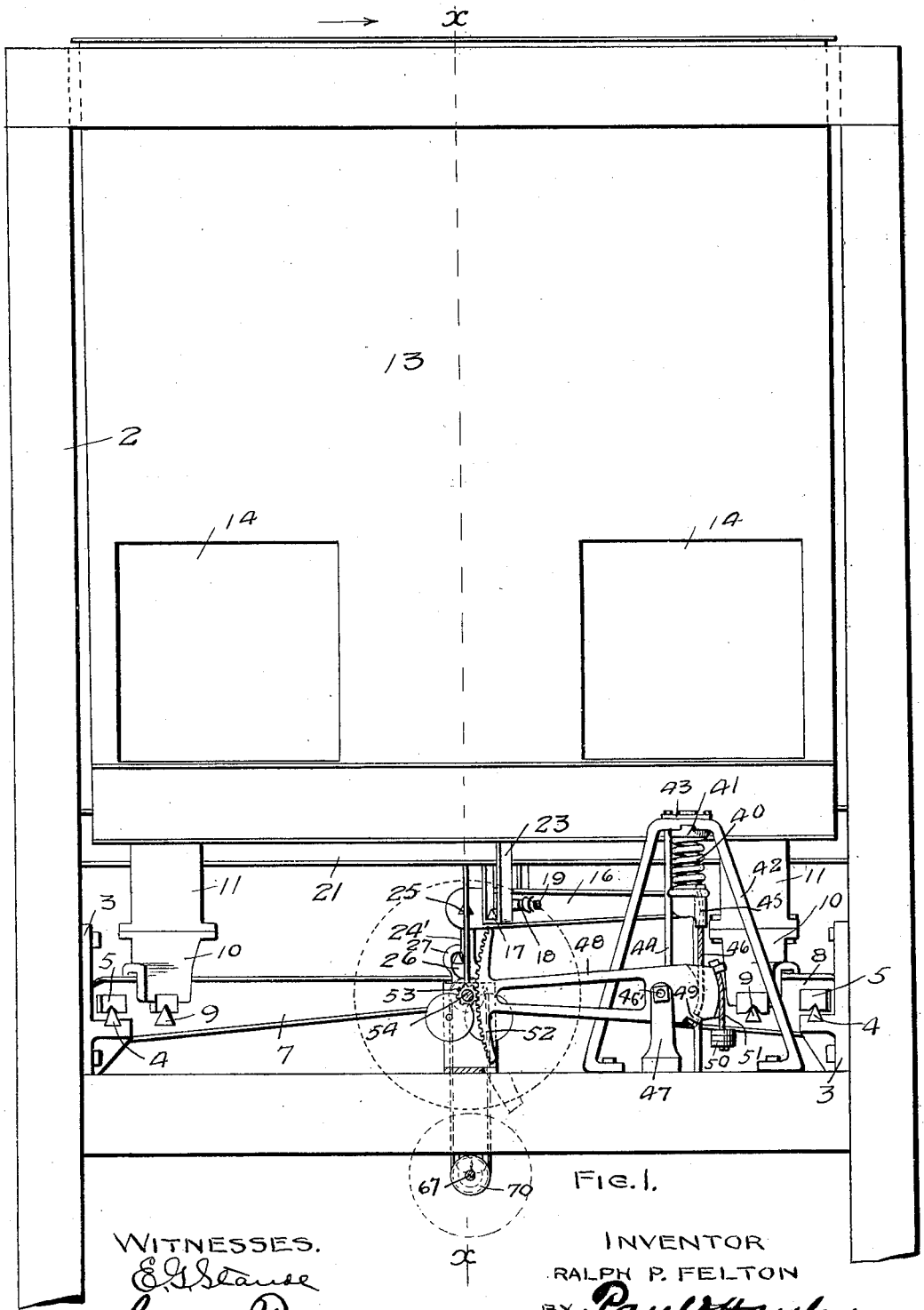
Figure 2:
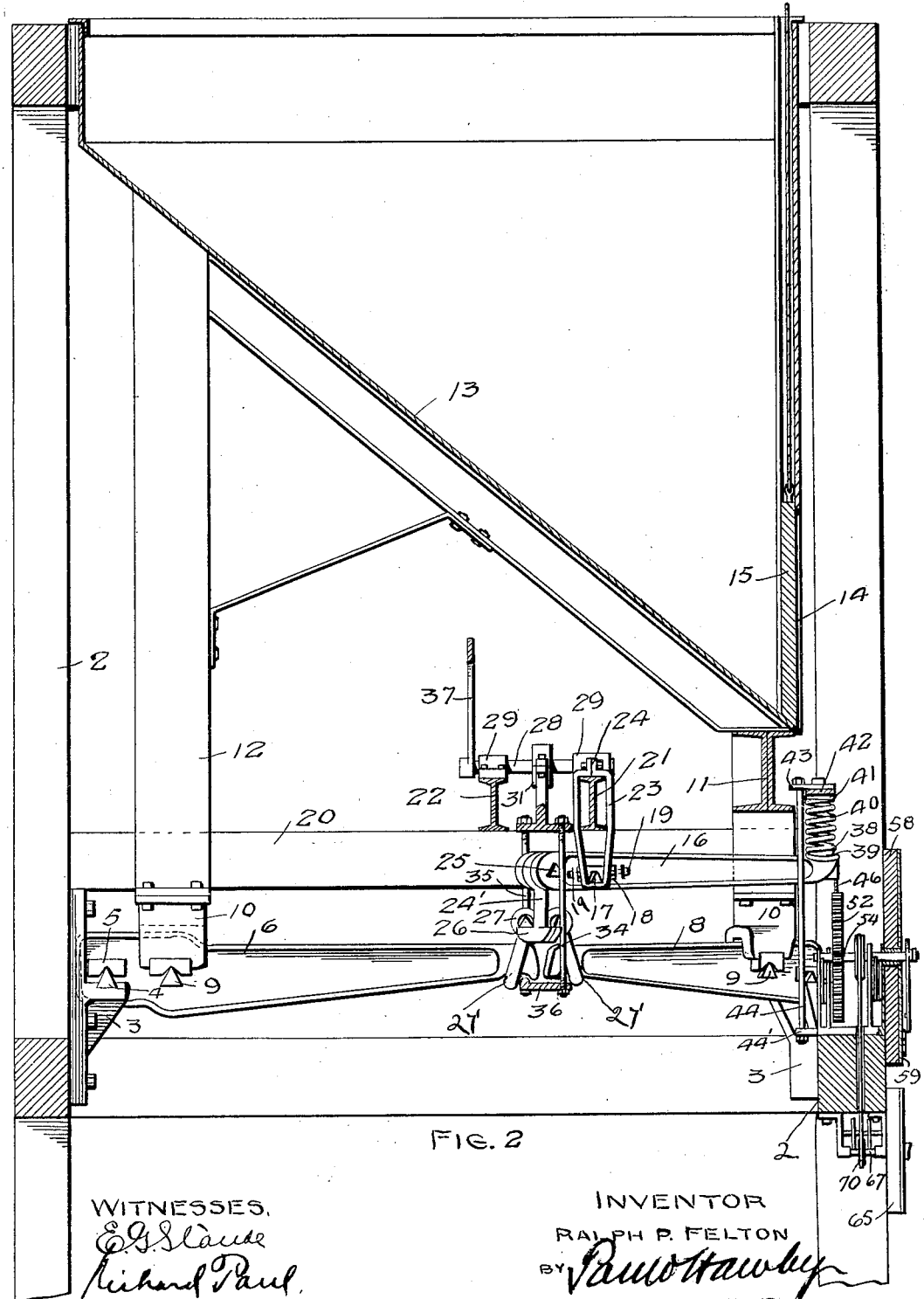

In the accompanying drawings, forming part of this specification, Figure 1 is a front elevation of a weighing-scale and hopper embodying my invention. Fig. 2 is a vertical section of the same on the line $xx$ of Fig. 1. Fig. 3 is a horizontal section showing the arrangement of the scale-levers and the mechanism for transmitting their motion to the indicating device. Fig. 4 is a front view of the indicating-dial. Fig. 5 is a vertical section of the same. Fig. 6 is a detail view showing the mechanism for elevating the inner ends of the scale-levers to relieve the scale-spring. Fig. 7 is a detail showing the manner of supporting the scale-spring upon one of the scale-levers. Fig. 8 shows a modified means for supporting the scale-spring and connecting it with the mechanism for operating the indicator. Fig. 9 is an end view of Fig. 8, the scale-spring being omitted.

In the drawings, 2 represents a frame wherein the weighing-scale and hopper are supported at a suitable height above the track to permit coal to be discharged by gravity from the hopper into a locomotive-tender beneath.

3 represents a series of brackets, preferably three in number, bolted to the frame, each having knife-edge bearings 4, whereon bearing-blocks 5, provided at the outer ends of scale-levers 6, 7, and 8, are pivotally supported. I also provide knife-edge bearings 9 on said levers for the forked lower ends of castings 10, provided beneath I-beams 11 and 12, which support the hopper 13. The hopper is provided with a bottom inclined from back to front and with discharge-openings 14 in its front wall, that are closed when the hopper is filled with coal by vertically-movable gates 15 or in any other suitable way. The hopper is vertically movable on its supports between the timbers of the framework and is adapted to contain a large quantity of coal, preferably about forty tons. The scale-levers 6, 7, and 8 are independently pivoted in substantially the same horizontal plane and, as shown in Fig. 3, radiate from a common point, and above them I provide a fourth scale-lever 16, having a knife-edge bearing 17, adjustable in a slot 18 in said lever by means of set-screws 19, which permits the scale-levers to be easily and accurately adjusted and the scale balanced when it is set up. Upon a cross-timber 20 beneath the hopper are I-beams 21 and 22, and on the I-beam 21 are links 23, having split upper ends connected by bolts 24 and supporting the knife-edge bearings 17 in their lower ends. The lever 16 is thus pivoted near its inner end, and in order that the inner ends of the levers 6, 7, and 8 may be supported and their motion transmitted without unnecessary friction to the lever 16 I prefer to pivot a hanger 24 on knife-edge bearings 25 in the short arm of the lever 16, said hanger being preferably provided with a series of recesses or slots arranged at intervals near its lower end, there being as many of these slots as there are scale-levers beneath. Within these slots I pivot the loops or eyes 27 of links 27′, in which the inner ends of the levers 6, 7, and 8 are pivotally supported. The radial levers 6, 7, and 8 are of equal length and of the same leverage, and the links 27' are equidistant with respect to said levers and each other, and as said levers have a single support at their inner ends a weight on the scale-platform will be weighed with the same accuracy whether it be in the middle of the platform bearing upon all of the levers or at one side of the platform and affecting but one lever.

In order that the lever 16 and the indicating mechanism may be relieved of strain and jar from the levers beneath, as when the hopper is being filled, I provide means for raising the inner ends of the radial levers 6, 7, and 8, which consists in providing a shaft 28, mounted in bearings 29 on the I-beams 21 and 22 and provided with an eccentric 30 within an eccentric-strap 31. Said strap is provided with flanges 32, and rods 33, 34, and 35 connect said flanges with the corners of a triangular plate 36, arranged beneath the inner ends of the radial levers. The plate 36 is normally out of contact with said levers; but when for any purpose it is desired to relieve the lever 16 of its load the operator, grasping a lever 37 on the shaft 28, may operate the eccentric and move the plate 36 into contact with the radial scale-levers and elevate their inner ends.

Near the outer end of the scale-lever 16 I provide a cup 38, having a ball-and-socket bearing 39 on said lever, and in said cup I arrange one end of a heavy coil-spring 40, whose opposite end fits within a socket in a similar inverted cup 41, that is held rigidly against lateral and vertical movement by an arched brace-rod 42, secured to a cross-timber of the frame. The cup 41 and spring are braced further by a plate 43 and rods 44, secured to a bracket 44'. From the above description it follows that a slight depression or movement of the inner end of the radial levers 6, 7, and 8 will be considerably multiplied through the medium of the lever 16 to compress the spring 40, supported on the long arm of said lever. The radial levers may be of any suitable length, and I prefer to pivot them so that their arms, respectively, will be in the ratio of seven to one. The arms of the lever 16 being in the ratio of nine to one, it follows that one pound at the spring will balance sixty-three pounds on the scale. To transmit the motion of the lever 16 to a suitable indicating device, I prefer to provide a curved socket 45 in its end near the scale-spring 40 and secure therein one end of a cable 46 by any suitable means permitting the adjustment of the cable. I also provide an indicator-lever 48, having its pivot supported upon adjustable centering-screws 46', the short arm of said lever being provided with a curved end surface and the lug 49, to which the lower end of the cable 46 is secured. This lug is arranged on the under side of the lever-arm, so that through the entire stroke of the indicator-lever and lever 16 the pull or strain of the cable thereon will be exerted on a tangent to the arcs of circles whose centers are the lever-pivots, thus insuring a uniform leverage on the indicating mechanism throughout the entire stroke or travel of the scale and indicator levers. I also prefer to provide the short arm of the lever 48 with a counterweight 50, suspended upon an adjustable cable 51, also tangentially attached to the short arm of the indicator-lever, by means of which the indicator lever and hand are returned to their normal position when the scale is relieved of its load.

In Figs. 8 and 9 I have shown the scale-spring arranged on the under side of a cross-timber on the frame and supported upon a plate 46', that is connected by rods 46'' with a similar plate 47' between the scale-lever 16 and the indicator-lever. One end of the cable 47'' is connected to the lever 16 and its other end extends through a hole in the plate 47' and is connected to an eyebolt 48' on the under side of said plate. A second cable 48'' is connected at one end to said eyebolt and its opposite end is secured within a socket in the indicator-lever. The motion of the scale-levers is thus transmitted through the rods 46'' to the spring and through the indicator-lever to the registering mechanism. The long arm of the lever 48 is provided with a segmental gear 52, engaging the teeth of a pinion 53, on a shaft 54, that is supported upon antifriction-bearings 55, mounted upon standards 56, arranged beneath the front of the hopper. Upon the shaft 54 I provide a hub 57, having a disk or plate 58, whereon is secured a large dial 59, graduated, preferably, to indicate tons and fractions of tons from one to ten. A threaded stud 60 is provided on the outer end of the shaft 54 to receive the hub of an indicator-hand 61, secured thereon by a nut 62. On the lower side of the dial a star-wheel 63 is mounted and adapted to be engaged and partially rotated by the engagement of a pin 64 on the indicator when it has nearly completed its revolution. A wheel may be provided having any desired number of points; but I prefer to employ one having four and adjust the pin 64 to advance the wheel one-quarter of a revolution for each complete revolution of the indicator. As the dial is graduated to indicate up to ten tons, I prefer to place numerals on the points of the star-wheel after the first that are multiples of ten—thus, "10," "20," and "30"—the sum of the graduations on the dial and the numerals on the wheel being forty tons, the preferred capacity of the hopper. On the first point I place a zero-mark, indicating, when the point is up or opposite the mark on the dial and the indicator is in the position indicated by dotted lines on the left of said point, that the hopper is empty. As the hopper is being filled the indicator will move over the dial from left to right and at each revolution will turn the star-wheel toward the left one step or quarter of a revolution. When the indicator has made three revolutions in this direction, the numeral "30" will be opposite the mark on the dial, indicating that thirty tons have been dumped into the hopper. At the end of its fourth revolution the indicator will stop in the position indicated by dotted lines on the right of the star-wheel and, pointing to the zero-mark on the dial, will indicate that the hopper is full or contains its capacity, forty tons. Should coal be taken from the hopper when it is full, the indicator, moving over the dial from right to left, will, in connection with the star-wheel, indicate at all times the amount remaining in the hopper. Should the indicator make a half-revolution and stop, the operator will know that five tons of coal have been withdrawn, and should it make a complete revolution, indicating that ten tons have been taken out of the hopper, the star-wheel will be moved toward the right one-quarter of a revolution, so that the numeral "20" will be opposite the mark on the dial, indicating, with the total of the dial-figures, thirty tons, or the amount of coal remaining in the hopper.

It is desirable to provide some means for making a permanent record of the number of tons and fractions of tons withdrawn from the hopper each time a locomotive is coaled. I therefore provide a small disk 65 under the dial 59, said disk being of wood, soft rubber, or other suitable material and centrally mounted on a hollow stud 66, secured on a shaft 67, that is supported in bearings in a hanger 68, secured to the timber whereon the indicating mechanism is supported. Antifriction wheels or bearings 69 for said shaft are provided in the hanger 68. A pulley 70 is provided on said shaft, over which a belt of suitable material passes to a similar pulley 71 on the shaft 54, permitting the two shafts to be driven at the same speed. Upon the disk 65 I arrange a small removable dial-sheet 72, preferably of bristol-board or heavy paper, having a radial slot 73, permitting it to be easily mounted on or removed from the stud 66. The face of said dial-sheet is graduated to represent tons and fractions of tons from one up to and including ten, said graduations running from the right toward the left in an opposite direction from those on the large dial 59. I have shown but one of the dial-sheets on the stud; but I prefer to arrange them in duplicate thereon, and to hold them in position I prefer to provide fingers 74, pivoted on said stud 66 and held in yielding contact with the surface of the sheet by springs 75. The pivoted ends of the fingers 74 are rounded, preferably, and bear upon the surface of the stud 66, and when said fingers are moved out to the position indicated by dotted lines in Fig. 5 their point of connection with said springs will be carried past the center of their pivots and the fingers will remain in this position while the operator removes the sheets and places others on the stud. Upon the outer end of the stud 66 I provide an arm 75', that moves over the face of the dial-sheet as the stud 66 and its shaft are revolved. If coal is being discharged from the hopper and the indicator-hand on the large dial moves to the left from "10" around to "7," the arm 75 will travel in the same direction over the dial-sheet until it reaches a point opposite the numeral "3" thereon, indicating that three tons have been drawn out. In order that a permanent record of the amount withdrawn may be made on the sheet, I prefer to provide a cylinder 76 on the arm 75, connecting the same by a duct 77 through said arm with a flexible tube fitting over the opening leading to said duct and provided with an air-bulb 78. Within the cylinder 76 I provide a piston 79, having its stem slidable in the end of the cylinder and provided with a prick-punch 80, preferably in the form of a V, which when the operator compresses the bulb will be forced into engagement with the dial-sheets, forming V-shaped perforations therein opposite the graduations on the dial over which the arm 75 has stopped. To withdraw the piston within the cylinder, I provide a spring 81 on the stem and in the opposite open end of the cylinder arrange a removable plug 82.

In operation, the hopper being full of coal, the locomotive-tender is stopped beneath the chute leading from the hopper, and the tender having been filled the indicator-hand 61 will, in connection with the star-wheel, show plainly the weight of the coal left in the hopper. The device below the large dial will indicate plainly the number of tons that have been discharged into the tender, and the operator having made a permanent record on the dial, as described, will remove the two copies from the disk, giving one to the locomotive-engineer and retaining the other to be forwarded to the general office for record. The railway official to whom the sheet is sent will thus have a complete record of the amount of coal burned by each locomotive, and the engineer can also keep a record, if he so desires, from the duplicate dial-sheets in his position and be able to check his records with those of the general office. The figures on the large dial being plainly visible for a considerable distance will enable the engineer to ascertain the amount of coal that is being delivered to the tender of his locomotive before the dial-sheet is turned over to him by the operator. When the scale is set up, I prefer to adjust the indicator-hand at zero and disregard entirely the weight of the hopper. I am thus able to simplify the operation of weighing, as the dial will indicate the net weight of the contents of the hopper, and the operator will not be obliged to figure gross and tare in ascertaining the weight of a quantity of coal or other material.

In placing the card or dial-sheet in position over the disk the zero-point is adjusted under the initial position of the revolving arm wherever it may be on the dial.

While I have described the scale as used in connection with a coaling-station, it will be understood that it may be used for weighing grain in an elevator or warehouse with equally-good results.

The advantages derived from suspending the radiating scale-levers upon a single pivotal support will be obvious from an examination of Fig. 6 of the drawings, wherein, as indicated by dotted lines, the center of the pivotal hanger and the pivots at the inner ends of said levers are always in line whether the weight on the scale be in the middle and bearing upon all of the levers or at one side and resting upon but one of them.

In various ways the details of the mechanism which I have herein described may be modified by any one skilled in the art, and I therefore do not wish to be confined to the particular construction set forth.

Having thus described my invention, I claim as new and desire to secure by Letters Patent—

1. The combination, with a scale frame and platform, of a series of levers arranged beneath and supporting said platform, said levers radiating from a common point and pivotally supported near their outer ends, a lever 16 pivotally supported upon the scale-frame, a single pivotal connection provided between the short arm of said lever 16 and the free inner ends of said radiating levers, whereby the depression of either lever is transmitted to said lever 16, means for elevating the inner ends of said radiating levers to relieve said lever 16 of its load, a spring connected with said lever 16 and compressed by the depression of said radiating levers, and a suitable indicating mechanism connected with the lever 16 whereby the movement of said radiating levers is registered, substantially as described.

2. The combination, with a scale frame and platform, of a series of levers radiating from a common center and pivotally supported near their outer ends whereon the scale-platform is supported, a lever 16 pivotally suspended above said radiating levers, a hanger 24 pivoted on the short arm thereof and provided with a series of slots corresponding in number to said radiating levers, links pivoted in slots and connected with the inner free ends of said radiating levers, whereby downward movement of either lever will be transmitted to the lever 16, the centers of the pivots at each end of said links and the center of the hanger-pivot being always in line, whereby greater accuracy in weighing is attained, a spring provided on the long arm of said lever 16 and compressed by the depression of said radiating levers, an indicator, a dial and a suitable connection between said indicator and said lever 16, whereby the movement of said levers is registered upon the dial, substantially as described.

3. The combination, with a scale frame and platform, of a series of levers radiating from a common point beneath said platform, said levers being pivotally supported near their outer ends and pivotally supporting said platform, a lever 16 pivotally supported above said radiating levers, a single pivoted connection provided between the short arm of said lever 16 and the long arms of said radiating levers, a shaft provided above said lever 16, an eccentric and strap thereon, a plate provided beneath the inner ends of said radiating levers, means connecting said plate and said eccentric-strap, means for revolving said shaft to elevate said strap and the inner ends of said radiating levers, a spring provided on the long arm of said lever 16, and a suitable indicating mechanism connected with said lever, substantially as described.

4. The combination, with a hopper, of pivoted scale-levers, a spring compressed by the upward movement on the long arm of one of said levers, a dial, an indicator mounted thereon, an indicator-lever for operating said indicator, means connecting said indicator-lever and said long arm of the scale-lever, said dial being provided with a series of graduations representing tons and fractions of tons, a star-wheel mounted on said dial and bearing numerals representing with the graduations on the dial the weight of the contents of the hopper, and a pin provided on said indicator and engaging said star-wheel at each revolution of the indicator, substantially as described.

5. The combination, with a series of pivoted scale-levers, of a hopper supported thereon, a spring connected with said levers and adapted to be compressed by the weight of the material placed in the hopper, a dial having graduations on its face representing tons and fractions of tons, an indicator, a shaft whereon the indicator is mounted, means connecting said shaft and the long arm of one of said scale-levers, whereby the movement of said levers will move the indicator over the dial, a graduated dial-sheet provided beneath said first-named dial, an indicator thereon, means connecting said second indicator and said shaft and means provided on said second indicator for making a permanent record on said dial-sheet, substantially as described.

6. In a weighing-scale, the combination, with a dial having a series of graduations on its face representing tons and fractions of tons, of a shaft, an indicator mounted on said shaft, means connected with the scale-levers for revolving said shaft, a disk provided near said dial, a removable dial-sheet provided on said disk, a second shaft, means for driving it from said first-named shaft, an arm mounted on said second-named shaft and revoluble therewith over said disk and the dial-sheet thereon, and means provided on said arm for making a permanent record on said dial-sheet, substantially as described.

7. In a weighing-scale, the combination, with a suitably-graduated dial, of a shaft and means connected with the scale-levers for revolving the same, an indicator mounted on said shaft, a star-wheel mounted on said dial and bearing numerals representing with the graduations on said dial the weight of the contents of the scale-hopper, means provided on said indicator to engage said star-wheel at each revolution of the indicator, a disk provided near said dial, a removable dial-sheet provided on said disk, an arm revoluble over said dial-sheet, a shaft whereon said arm is mounted, means for driving said last-named shaft from said first-named shaft, and means provided on said arm for perforating said dial-sheet opposite the graduations beneath said arm, for the purpose specified.

8. In a weighing-scale, the combination, with a graduated dial, of an indicator thereon, means for operating said indicator, a disk or plate provided near said dial, a graduated dial-sheet thereon, a stud, a shaft whereon said stud is mounted, means connecting said shaft with the driving means of said indicator, means provided on said stud and engaging said dial-sheet, an arm mounted on said stud, a cylinder thereon, a piston provided in said cylinder, a punch provided on the stem of said piston, and means within control of the operator for operating said piston to move said punch into engagement with the dial-sheet, substantially as described.

9. The combination, with a scale frame and platform, of a series of levers radiating from a common center and pivotally supported near their outer ends whereon the scale-platform is arranged, a lever 16 pivotally supported above said radiating levers, a hanger 24' pivoted on the short arm of said lever 16 and provided with a series of slots corresponding in number to said radiating levers, links 27' pivotally connected to said hanger in said slots, the inner ends of said radiating levers being pivotally supported in said links, the centers of the pivots at each end of said links being in line with the pivotal center of said hanger, means for elevating the inner ends of said radiating levers, a spring provided on the long arm of said lever 16 and compressed by the depression of said radiating levers, an indicator, a dial, and a suitable connection between said indicator and said lever 16 whereby the movement of said levers is registered upon the dial, substantially as described.

10. The combination, with a scale frame and platform, of a series of levers radiating from a common point beneath said platform, said levers being pivotally supported near their outer ends and pivotally supporting said platform, a lever 16 having a slot 18, a knife-edge bearing 17 adjustably arranged in said slot, an I-beam 21, links 23 depending from said I-beam and supporting said bearing 17 and said lever 16, a hanger 24 pivotally connecting the short arm of said lever 16 and the long arms of said radiating levers, a spring provided on the long arm of said lever 16 and adapted to be compressed by the outward movement of the same, a dial, an indicator-hand therefor, and suitable means connecting the long arm of said lever 16 and said indicator-hand whereby the movement of said levers is registered upon the dial, substantially as described.

11. In a weighing-scale, the combination, with a dial having a series of graduations on its face representing tons and fractions of tons, an indicator mounted on said dial, means connected with the scale-levers for revolving said indicator, a disk provided near said dial, a removable dial-sheet provided on said disk, an arm mounted on said disk and revoluble over said dial-sheet, means connecting said arm with said indicator, whereby it is revolved simultaneously therewith, and means provided on said arm for making a permanent record on said dial-sheet, substantially as described.

12. The combination, with a scale frame and platform, of a series of platform-levers having their inner ends radiating from a common center and lying in substantially the same horizontal plane, a scale lever or beam arranged above said platform-levers, a device pivoted on the short arm of said scale-lever, independent pivoted connections provided between said device and the inner or long arms of said platform-levers, the centers of the pivots of said device and said pivoted connections being always in line even though the weight be on one platform-lever only, whereby greater accuracy in weighing is attained, a spring connected with the long arm of said scale-lever and adapted to be compressed by the movement of the same, and a suitable weighing mechanism connected with said scale-lever, substantially as described.

13. The combination, with a scale frame and platform, of three levers radiating from a common center beneath said platform and pivotally supported near their outer ends, a fourth lever pivotally suspended above said radiating levers, a hanger device pivoted on the short arm of said fourth lever, independent pivoted connections provided between said hanger device and the inner or long arms of said radiating levers, the centers of the pivots of said hanger device and said pivoted connections being always in line, whereby greater accuracy in weighing is attained, a spring connected with the long arm of said fourth lever and adapted to be compressed by the depression of said radiating levers, and a suitable registering device connected with said fourth lever, substantially as described.

14. The combination, with a scale frame and platform, of a series of levers radiating from a common center and pivotally supported near their outer ends beneath said platform, a lever 16 pivotally suspended above said radiating levers, a hanger pivoted on the short arm of said lever 16, a series of links pivotally supported on said hanger and pivotally connected with the long arms of said radiating levers there being as many links as there are radiating levers, the centers of the pivots of said hanger and said links being always in line though the weight on the scale-platform be at one side of the center thereof, whereby greater accuracy in weighing is attained, a spring connected with the long arm of said lever 16, and compressed by the depression of said radiating levers, and a suitable indicating mechanism connected with the long arm of said lever 16, substantially as described.

15. The combination, with a scale frame and platform, of pivoted platform-levers radiating from a common point beneath said platform, a scale-lever pivotally supported above said platform-levers, means connecting the short arm of said scale-lever with the long arm of said platform-levers, a spring connected with the long arm of said scale-lever, an indicator, a dial having a graduated face over which said indicator is movable, a suitable mechanism provided between said indicator and said scale-lever, whereby the movement of said platform and scale levers will be registered upon the dial, a disk provided near said dial and having graduations corresponding to those on said dial, and a recording device provided on said disk and connected with said indicator, substantially as described.

In witness whereof I have hereunto set my hand this 29th day of January, 1900.

RALPH P. FELTON.

In presence of—
RICHARD PAUL,
M. C. NOONAN.